United States Patent
Pylvaenaeinen et al.

(10) Patent No.: US 9,984,494 B2
(45) Date of Patent: May 29, 2018

(54) MAP-LIKE SUMMARY VISUALIZATION OF STREET-LEVEL DISTANCE DATA AND PANORAMA DATA

(71) Applicant: Uber Technologies, Inc., San Francisco, CA (US)

(72) Inventors: Timo Pylvaenaeinen, Menlo Park, CA (US); Thommen Korah, San Ramon, CA (US); Jerome Berclaz, Sunnyvale, CA (US); Myra Nam, Sunnyvale, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 45 days.

(21) Appl. No.: 14/605,912

(22) Filed: Jan. 26, 2015

(65) Prior Publication Data
US 2016/0217611 A1   Jul. 28, 2016

(51) Int. Cl.
*G06T 17/00* (2006.01)
*G06T 15/20* (2011.01)
(Continued)

(52) U.S. Cl.
CPC .......... *G06T 15/205* (2013.01); *G06T 15/405* (2013.01); *G06T 17/05* (2013.01)

(58) Field of Classification Search
None
See application file for complete search history.

(56) References Cited

U.S. PATENT DOCUMENTS 6,249,616 B1 * 6/2001 Hashimoto ............... G06T 7/35
                                              345/427
6,266,068 B1 * 7/2001 Kang ..................... G06T 11/60
                                              345/422

(Continued)

FOREIGN PATENT DOCUMENTS

JP       2003296709 A       10/2003

OTHER PUBLICATIONS

Hohmann, B. et al., "CityFit—High-Quality Urban Reconstructions by Fitting Shape Grammars to Images and Derived Textured Point Clouds," Proceedings of the 3rd ISPRS International Workshop 3D-ARCH 2009, Feb. 25-28, 2009, pp. 1-8.

(Continued)

*Primary Examiner* — Anh-Tuan V Nguyen
(74) *Attorney, Agent, or Firm* — Fenwick & West LLP (57) ABSTRACT

Architecture that summarizes a large amount (e.g., thousands of miles) of street-level image/video data of different perspectives and types (e.g., continuous scan-type data and panorama-type data) into a single view that resembles aerial imagery. Polygons surfaces are generated from the scan patterns and the image data is projected onto the surfaces, and then rendered into the desired orthographic projection. The street-level data is processed using a distributed computing approach across cluster nodes. The collection is processed into image tiles on the separate cluster nodes representing an orthographic map projection that can be viewed at various levels of detail. Map features such as lower-level roads, that are at lower elevations than higher-level roads, and are hidden by higher-level overpassing roads, can be navigated in the map. With the summarized data, the maps can be navigated and zoomed efficiently.

16 Claims, 9 Drawing Sheets

(51) Int. Cl.
G06T 15/40 (2011.01)
G06T 17/05 (2011.01)

(56) References Cited

U.S. PATENT DOCUMENTS

| | | | | |
|---|---|---|---|---|
| 6,853,738 | B1* | 2/2005 | Nishigaki | G01C 3/085 348/139 |
| 7,386,188 | B2* | 6/2008 | Peterson | G06T 3/4038 345/629 |
| 8,159,524 | B2 | 4/2012 | Wilson et al. | |
| 8,311,287 | B2 | 11/2012 | Mishra et al. | |
| 8,890,868 | B2* | 11/2014 | Barenburg | G06T 15/205 345/419 |
| 8,994,738 | B1* | 3/2015 | Hernandez Esteban | G06T 13/80 345/475 |
| 9,036,000 | B1* | 5/2015 | Ogale | H04N 5/232 348/36 |
| 2003/0228071 | A1* | 12/2003 | Gimenez | G06T 3/40 382/298 |
| 2004/0105573 | A1* | 6/2004 | Neumann | G06T 17/00 382/103 |
| 2004/0257360 | A1* | 12/2004 | Sieckmann | G06T 17/05 345/419 |
| 2006/0244746 | A1* | 11/2006 | England | G06T 11/60 345/419 |
| 2007/0076920 | A1* | 4/2007 | Ofek | G06T 3/4038 382/113 |
| 2008/0088623 | A1* | 4/2008 | Bukowski | G06T 17/00 345/423 |
| 2008/0221843 | A1* | 9/2008 | Shenkar | G06T 17/05 703/1 |
| 2008/0291201 | A1* | 11/2008 | Lafon | G06T 15/205 345/427 |
| 2008/0291217 | A1 | 11/2008 | Vincent et al. | |
| 2010/0207936 | A1* | 8/2010 | Minear | G06T 7/0024 345/419 |
| 2011/0043604 | A1* | 2/2011 | Peleg | G06T 3/4038 348/36 |
| 2011/0115812 | A1* | 5/2011 | Minear | G06T 17/00 345/593 |
| 2011/0128412 | A1* | 6/2011 | Milnes | G02B 27/22 348/231.99 |
| 2011/0320116 | A1 | 12/2011 | DeMaio et al. | |
| 2012/0038751 | A1* | 2/2012 | Yuan | H04N 5/23232 348/51 |
| 2012/0081544 | A1* | 4/2012 | Wee | G01S 17/023 348/140 |
| 2012/0212477 | A1* | 8/2012 | Grindstaff | G06T 5/003 345/419 |
| 2012/0233573 | A1* | 9/2012 | Sullivan | G06F 3/048 715/848 |
| 2012/0299920 | A1* | 11/2012 | Coombe | G06T 19/00 345/423 |
| 2012/0320228 | A1* | 12/2012 | Imade | G06T 3/4069 348/220.1 |
| 2013/0010111 | A1* | 1/2013 | Laforte | G08B 13/19645 348/143 |
| 2013/0016102 | A1* | 1/2013 | Look | G06T 15/20 345/426 |
| 2013/0038696 | A1* | 2/2013 | Ding | G02B 5/09 348/47 |
| 2013/0070050 | A1* | 3/2013 | Ha | H04N 5/144 348/43 |
| 2013/0103303 | A1 | 4/2013 | Lynch | |
| 2013/0169685 | A1 | 7/2013 | Lynch | |
| 2013/0207973 | A1* | 8/2013 | Mattila | G06T 13/80 345/420 |
| 2013/0216139 | A1* | 8/2013 | Nakagawa | G06K 9/4604 382/201 |
| 2014/0002439 | A1* | 1/2014 | Lynch | G09B 29/007 345/419 |
| 2014/0049537 | A1* | 2/2014 | Sahoo | G06T 19/006 345/419 |
| 2014/0146046 | A1 | 5/2014 | Coombe et al. | |
| 2014/0146173 | A1* | 5/2014 | Joyce | G01C 11/04 348/144 |
| 2014/0211989 | A1* | 7/2014 | Ding | G06K 9/6211 382/103 |
| 2014/0267243 | A1* | 9/2014 | Venkataraman | G06T 7/0065 345/419 |
| 2014/0336806 | A1* | 11/2014 | Bewlay | G06F 17/50 700/98 |
| 2014/0362082 | A1* | 12/2014 | Schpok | G06T 17/05 345/427 |
| 2015/0109293 | A1* | 4/2015 | Wang | G06T 15/405 345/422 |
| 2015/0109419 | A1* | 4/2015 | Vollrath | G01C 3/02 348/47 |
| 2015/0193963 | A1* | 7/2015 | Chen | G06K 9/0063 345/426 |
| 2015/0206343 | A1* | 7/2015 | Mattila | G06T 17/05 345/420 |
| 2015/0243080 | A1* | 8/2015 | Steinbach | G06F 17/30244 345/633 |
| 2015/0341552 | A1* | 11/2015 | Chen | H04N 5/23238 348/38 |
| 2016/0012633 | A1* | 1/2016 | Wei | G06T 17/05 345/420 |
| 2016/0112630 | A1* | 4/2016 | Kanumuri | H04N 5/23222 348/239 |

OTHER PUBLICATIONS

PCT International Search Report and Written Opinion, PCT Application No. PCT/US2016/014972, dated Jun. 2, 2016, 13 pages.
Zebedin, et al., "Towards 3D Map Generation from Digital Aerial Images", In ISPRS Journal of Photogrammetry and Remote Sensing, vol. 60, Issue 6, Sep. 2006, 20 pages,
Kim, et al., Automatic Registration of LiDAR and Optical Imagery using Depth Map Stereo, In IEEE International Conference on Computational Photography, May 2, 2014, 8 pages.
Prandia, et al., "Lidar and Pictometry Images Integrated Use for 3d Model Generation", In the International Archives of the Photogrammetry, Remote Sensing and Spatial Information Sciences, Jul. 3, 2008, 8 pages.
Schwarz, Brent., "Mapping the world in 3D", In Nature Photonics, vol. 4, Jul. 2010, 2 pages.
Boyko, et al., "Extracting Roads from Dense Point Clouds in Large Scale Urban Environment", In ISPRS Journal of Photogrammetry and Remote Sensing, vol. 66, Issue 6, Oct. 2011, 30 pages.
Leberl, et al., "Recognizing Cars in Aerial Imagery to Improve Orthophotos", In Proceedings of the 15th annual ACM international symposium on Advances in geographic information systems, Nov. 2007, 9 pages.
Chen, et al., "The Generation of True Orthoimages Using Dem, 3d Road Models, and Multi-View Aerial Images", Retrieved on: Sep. 22, 2014, 6 pages, Available at: http://a-a-r-s.org/aars/proceeding/ACRS2006/Papers/M-2_M7.pdf.
Weiss-Malik, et al., "Project Ground Truth: Accurate Maps via Algorithms and Elbow Grease", Retrieved on: Sep. 29, 2014, 2 pages, Available at: Project Ground Truth: Accurate Maps via Algorithms and Elbow Grease.
Kopf, et al., "Street Slide", In Special Interest Group on Computer Graphics and Interactive Techniques Conference, Jul. 26, 2010, 3 pages.
Walcher, et al., "The Microsoft Global Ortho Program", In ISPRS Annals of the Photogrammetry, Remote Sensing and Spatial Information Sciences, vol. I-4, Aug. 25, 2012, 6 pages.
"Bing Maps Tile System", Retrieved on: Sep. 29, 2014, 8 pages, Available at: http://msdn.microsoft.com/en-us/library/bb259689.aspx.

* cited by examiner

MAP-LIKE SUMMARY VISUALIZATION OF STREET-LEVEL DISTANCE DATA AND PANORAMA DATA

BACKGROUND

It is difficult and computationally expensive to combine millions of panoramas and object distance data (e.g., obtained via LIDAR, where one source defines LIDAR as a light detection and ranging technology that analyzes the properties of reflected light off a target) scan data into a single view. Moreover, accessing and rendering terabytes of collected distance data in realtime is a difficult undertaking. Even if rendered in a traditional 3D (three-dimensional) view, perhaps as colored point cloud where the color is picked from panoramas, it is difficult to pick the important road features. Similarly, processing millions of panoramas and applying this information to a map from a panoramic view is currently extremely tedious and difficult.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture summarizes a large amount (e.g., thousands of miles) of street-level image/video data of different perspectives and types (e.g., continuous scan-type data (e.g., LIDAR), panorama-type data, etc.) into a single view that resembles aerial (or bird's-eye) imagery. Panorama images and continuous scan data provide exceptional details in imagery that can then be extracted and used to improved mapping details for user viewing.

Viewing the data as aerial views enables the expedient application of map geometry (e.g., roads, lanes, streets, routes, etc.) and geometry annotation information (e.g., street names, landmark names, structure names, etc.) to a map that includes, but is not limited to, regulatory information such as stops, yields, and lane turn restrictions, route paintings, curbs, sidewalks, ingress and egress, etc. Thus, the street-level collection of view data can be used to add useful details to maps. For example, road paintings and curbs are visible in the panorama data and scan data at exceptional detail.

The collection of street-level data (e.g., panorama and scan data) is processed using a distributed computing approach across cluster nodes. The collection is processed into image tiles on the separate cluster nodes representing an orthographic map projection that can be quickly viewed at various levels of detail. Multiple viewpoints, such as a direct top-down (nadir) or forty-five degree oblique perspective facing different compass directions, can be generated. In addition, map features such as lower-level roads, that are at lower elevations than higher-level roads, and are hidden by higher-level overpassing roads, can be navigated in the nadir map. With the summarized data, the maps can be navigated and zoomed extremely efficiently.

The generation of the map tiles can be based, in part, on the specific scanning pattern of the given scanning system (e.g., the laser and sensor head arrangement). For example, in one implementation, the scanning system can comprise thirty-two lasers that rotate around (approximately) the vertical axis. This enables an approximate 360-degree depth map at any scan point. Other types of scanning system sensors may have different patterns.

Three-dimensional (3D) triangles can be formed by joining the three points of the scan data thereby creating a 3D surface element. Alternatively, other polygons can be employed, such as quadrilaterals, for example, by joining four points from the scan pattern, and so on.

The panorama data is projected onto this 3D triangular surface, and then rendered to the desired orthographic projection. A depth map can be generated by rendering the 3D surface onto a z-buffer. The z-buffer is used to determine if pixels originating from some other triangle (polygon) are to be processed to overwrite a previous rendering.

Tiles in the same geographical area, yet rendered independently from different data (e.g., data obtained by different scan sources (e.g., vehicles) of the same type of scanning system) can be similarly merged by taking the pixels in the rendering that has the smaller z-value in the z-buffer (assuming that registration has been performed). Data obtained by different scan sources (e.g., vehicles) at different times are automatically geographically-registered beforehand to facilitate the distributed processing.

The disclosed architecture enables technical effects that at least simplify software development and application execution by requiring less data to be handled and processed to give the user an improved user experience when navigating maps. Additionally, the architecture enables enhanced usability by the user and hardware by controlling the number of aerial views that can be presented and enabling efficient processing and execution on user devices such as portable computing devices (e.g., cell phones, tables, etc.). The distributed processing aspect reduces the time the user would otherwise expend in waiting for map tile rendering and navigation. Moreover, only a file that comprises the orthographic view is sent to the user device, which has the effects of reducing network usage and local device resources that would otherwise be needed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

A well-known and standard approach to view streets in a virtual way is to exploit the rendering of a panoramic view, and to explore the streets, where the user can pan around and possibly move to other panoramas along the street. This provides more detail than the aerial view of LIDAR point clouds; however, locating a specific landmark may be tedious and requires the browsing of a large amount of panorama images (panoramas) and locations.

An aerial view is better suited for quickly exploring an area. Normally, the aerial view is captured separately from either panoramas or LIDAR scans; however, by combining LIDAR with panoramas, a synthetic aerial view can be rendered that has specific advantages.

The disclosed architecture exploits and combines street-side panorama images and LIDAR to generate a sophisticated map that visualizes detailed street surfaces at various levels of detail, and from multiple points of views and elevations. Streetside panorama images are valuable because such images contain detailed street views in color. Panorama images provide more detail than the aerial view of LIDAR point clouds, but locating a specific landmark may be tedious and requires browsing a large amount of panoramas/locations. However, an aerial view is much better suited for quickly exploring a geographical area.

In order to introduce a better understanding of road geometry as a whole, the map experience is improved by combining LIDAR scan data with panorama images. This can be a challenging problem since it requires accessing and rendering terabytes of collected LIDAR data, and mapping vast amounts of panorama images into LIDAR.

Both forms of data can be processed using a map-reduce-like distributed computing system, for example, or other suitable computational algorithms, which generates tiles of color and depth, thereby enabling the production of clean map tiles that are free from clutter caused by moving cars and noise. Moreover, map navigation is enabled at different view points, at different levels of details, and underneath overpassing roads. The new map experience enriches road/lane geometry farther out than other existing maps, and makes possible the addition to the map of road attributes such as road signs and lane turn restrictions.

The disclosed architecture enables the visualization of large amounts of panoramas and distance data (e.g., LIDAR) from "bird's eye" view, rendered as map tiles. The scan pattern of the LIDAR head is utilized to generate "proxy" geometry used for rendering the bird's-eye view. Clutter is removed from the street based on "road surface estimation". Additionally, tile generation is distributed by processing arbitrary subsets of the distance data (e.g., LIDAR) independently into tiles of color and depth (image+depth map), and thereafter, merging multiple renderings of the same tile using the depth maps. Additionally, multiple elevation layers of road maps are visualized that enable the navigation of roads visually hidden by overpassing roads or other structures. The input data can comprise hundreds of miles of street-side (also "street-level") data comprising a full 360-degree panorama data captured at regular distance intervals (e.g., approximately every four meters) and continuous distance scan data (e.g., LIDAR).

The architecture enables the visibility of underlying structures such as tunnels, a useful feature that would otherwise never be available in a real aerial view. For example, oblique views of a tunnel from different directions, the underground nature of the tunnel, and building facades are also visible, where all views are generated from the same source data. Moreover, a level-of-detail (LoD) "pyramid" (e.g., summarizing tens of thousands of panoramas) can be generated from the map tiles, thereby enabling flexible zooming. The pyramid (e.g., square) is formed by an increasing number of tiles from the apex of the pyramid to the pyramid base. At the pyramid apex is the LoD with the lowest resolution (e.g., designated LoD 1, for four tiles for the lowest amount of detail) to the highest resolution LoD at the base (e.g., LoD 16), which when stacked from the apex to the pyramid base (e.g., LoD 1 to LoD 16) forms the appearance of a pyramid.

Each tile has a quadkey, representing the physical location in two dimensional coordinates. A tile is partitioned into four, each of which is assigned to another quadkey. The length of quadkey and patterns indicate what level of pyramid the tile comes from and which tile is its parent or child. One implementation can employ a top-down approach to create tiles in a pyramid. This is a recursive process, where the base tile with 16-digit quadkey is partitioned into four tiles and the partitioning repeats until quadkey length reaches twenty-one (the highest LoD, or the most zoomed-in). Once the process reaches the highest LoD, the process creates the tile by combining (or merging) multiple partial tiles that were independently created from the partitioned distance dataset. Once the tiles at highest LoD are created, the lower-level tiles in the pyramid are created from associated child tiles, and so on.

The pyramid map is created by taking all the scanned data points, coloring these scanned data points from the panorama images, and then projecting these into a global the bird's-eye view. Thus, in the pyramid map only the highest pixels can be viewed in a top-down view of the map, showing a network of road, streets, avenues, etc. A client program (e.g., browser) handles the zooming in and out of such a map.

Put another way, distance data is employed with panorama image data, and preprocessed into selected (specific) orthographic views such as top-down and oblique, and other views as well. The capability to view from arbitrary views is restricted to bring greater efficiency to navigate all of this input data that is originally supplied. All rendering can be performed in a cloud cluster as preprocessing, and published as the final results to the user device. The consuming application of the user device only sees what is provided in the published file. This also occurs for aerial imaging, which has perspective, and which is converted into an orthographic projection, tiled, and then served out to the consuming application.

The specific set of views can be defined as typically NE (Northeast), SW (Southwest) at forty-five degrees and top-down, but there can be a compromise on the amount of data employed, so the number and types of views are controlled. Processing such as color balancing can be performed and employed between two sets (e.g., adjacent) of panorama data so as to minimize the disruptive aspects created from the non-continuous image capture aspects of cameras, thereby making the visualization more seamless. An alternative method can be to use Poisson blending and graph-cut seaming, such as can be performed in typical image stitching.

When data is captured at multiple levels, such as when the acquisition vehicle drives every ramp of a multi-level overpass, it is possible to separate different layers of the data and provide alternate views in the final rendering. One approach that provides a significant benefit is to use two rules: keep closest and keep farthest. This produces two views: a view for the top which shows things the user would expect to see in aerial photos, and a view for below, which shows things such as tunnels and the lowest levels of multi-level overpass. It can also be a case to select images to render at all levels—not just two levels.

Without LIDAR, it is possible to reconstruct the geometry near a vehicle solely from the images. Geometry can be generated using "standard" structure from motion techniques. That is, computer vision techniques can be used to identify correspondence points between two views captured from different points in the world. If capture locations are known, structure can be recovered through triangulation of correspondence points. Further, with a sufficient number of correspondence points, the relative capture locations can also be recovered—up to a similarity transformation.

However, LIDAR distance points provide enhanced rendering of the map tiles. Moreover, the specific head orientation of any given LIDAR scanning system can be exploited for polygon creation.

Employing imagery with scan point geometry, projecting that imagery onto the geometry, and then rendering from another viewpoint using with distance data comparison provides an enhanced and more efficient mapping experience for the user. When a distance point is obtained that is closer to the camera, the closer point overrides any prior point that is farther away. More specifically, the point is closer to the "virtual camera" generating the current projection. So, for example, for the typical Nadir (top-down) view, "closer to camera" is equivalent to "higher up". For an oblique 45-degree NE orthographic view, closer to camera means roughly farther southwest, or higher up. This is because the virtual camera for that projection is at infinity towards SW and forty-five degrees up from horizon; thus, anything farther away in that direction is "closer".

This operation can be performed as distributed cluster processing; each cluster node generates a partial rendering with different depths, which are then combined by merging the depth maps. This method of processing makes it possible to accomplish output in a parallel and distributed way.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
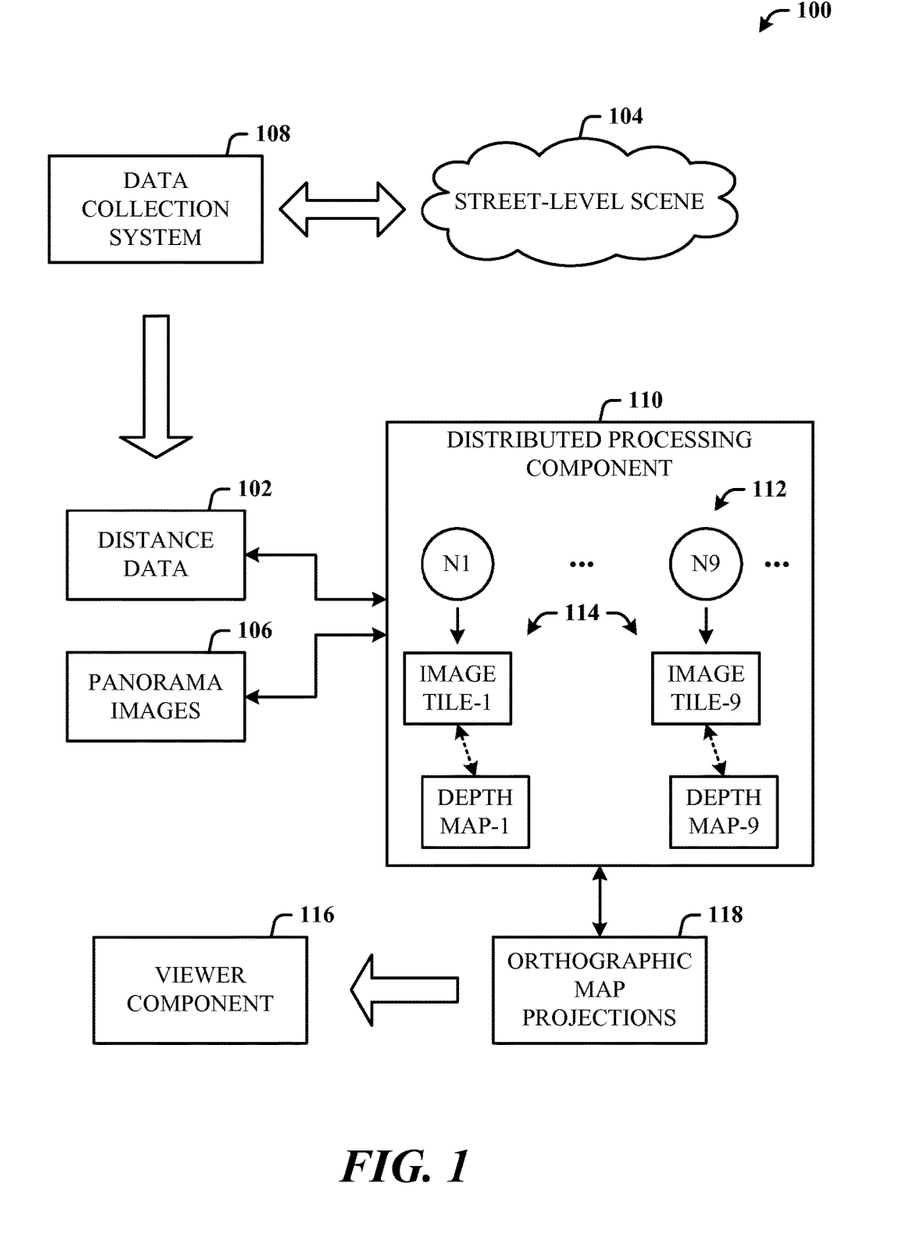
FIG. 1 illustrates a system in accordance with the disclosed architecture.

FIG. 1 illustrates a system 100 in accordance with the disclosed architecture. The system 100 can include distance data 102 to points in a street-level scene 104 and panorama images 106 that include the street-level scene 104. The distance data 102 and the panorama images 106 can be sensed using a data collection system 108 that comprises a scanning system and an image capture system.

A distributed processing component 110 can be provided and configured to distributively process the distance data 102 and the panorama images 104 using distributed computing nodes 112. Each of the computing nodes 112 can be configured to process an arbitrary set of the panorama images 106 and the distance data 102 into image tiles and associated depth maps 114 of specified orthographic projections. Additionally, the processing nodes 112 each process a specific arbitrary set of the distance data 102, and one or more of the panorama images 106 associated only with the specific arbitrary set.

Note that although depicted in FIG. 1 as showing a single tile for each node, it is to be understood that each node can produce any number of tiles, and the same tile (in terms of area on the map, i.e., the same quad key) can be produced by multiple nodes. This is where a map-reduce-like nature of the process is evident. The tile quad key is the key, and the (partial) tile the value. The reduce step (tile fusion) takes the tiles with the same key, and combines these tiles into a single tile through logic that chooses (or combines) the pixel(s) from the input tiles with some logic based on depth and color. In one implementation, the pixel is taken from the tile that has smallest depth (closest to virtual camera).

The system 100 can further comprise a viewer component configured to view the image tiles (e.g., Image Tile-1, Image Tile-9, etc.) as the orthographic map projections 118 as aerial views that include the street-level scene 104. The viewer component 116 can be a map application that enables the user to view the results as a map for zoom and rotation of the aerial views of the scene. The viewer component 116 further enables the capabilities of tiling and stretch, for example.

Figure 2:
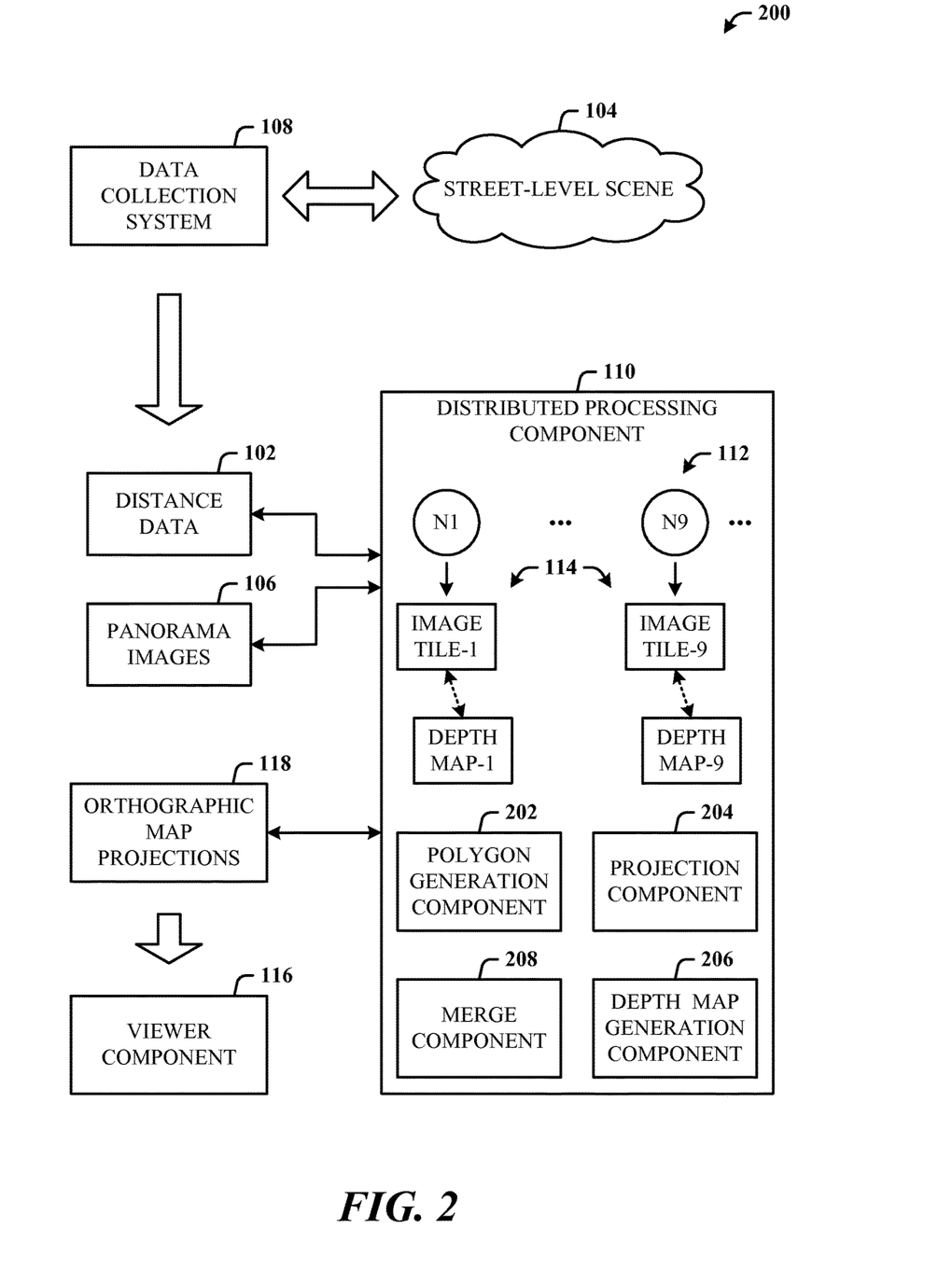
FIG. 2 illustrates an alternative implementation of a system in accordance with the disclosed architecture.

FIG. 2 illustrates an alternative implementation of a system 200 in accordance with the disclosed architecture. The system 200 comprises the components and items of system 100 of FIG. 1, and additionally, a polygon generation component 202, a projection component 204, a depth map generation component 206, and a merge component 208. One or more of these components can be implemented in a non-distributed way where processing time is less of or not a constraint.

The polygon generation component 202 is provided and configured to generate polygons of a specific geometry based on a scan pattern of the scanning system. The projection component 204 is provided and configured to project the panorama images onto the polygons to create projected images. The tiles are already intrinsically in a specified projection. In one implementation, each tile is stretched and rotated, so that for a flat world, every oblique orthographic projection produces exactly the same tiles, and that the same (lat, long) coordinate on the ellipsoid (e.g., WGS-84 (world geodetic system-84)) maps to exactly the same pixel on the same tile.

Points higher (or lower) than the ellipsoid surface, however, lean to a specific direction depending on the specified projection. In the final rendering, typically, points higher up lean toward the top of the screen. To achieve this, tiles are stretched and rotated. The predetermined orthographic projection direction, however, are not altered at "render time". The partial tiles produced by each node are already in a fixed orthographic projection. The distributed preprocessing of the tiles can be considered a rendering step.

The depth map generation component 206 is provided and configured to generate the depth maps of the polygons onto a z-buffer. The merge component 208 is provided and configured to merge multiple renderings of image tiles of a same area, as part of the distributed processing, using the associated depth maps. The merge component 208 can also merge image tiles rendered independently from different data based on z-buffer values of the associated depth maps.

It is to be understood that in the disclosed architecture certain components can be rearranged, combined, omitted, and additional components may be included. For example, the merge component 208 can be part of the distributed processing component 110. As another example, one, some, or all of the polygon generation component 202, the projection component 204, and depth map generation component 206, can be implemented as part of or external to the distributed processing component 110. Additionally, in some implementations, all or some of the components are present on the client, while in other implementations some components may reside on a server or are provided by a local or remote service.

Figure 3:
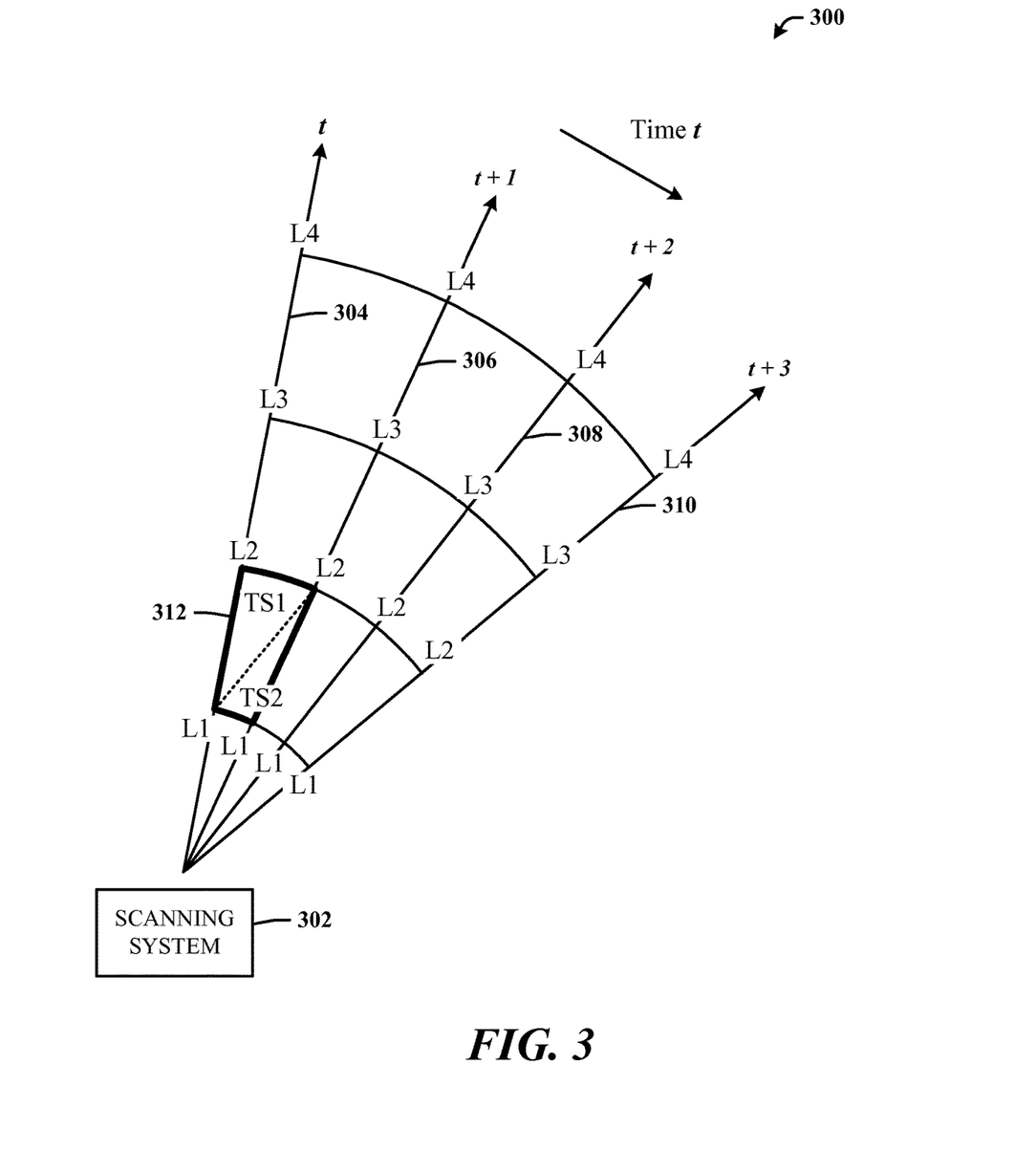
FIG. 3 illustrates an exemplary scan pattern from a top-down view.

FIG. 3 illustrates an exemplary scan pattern 300 from a top-down view. In this particular implementation, a scanning system 302 is oriented to capture a full 360-degree depth map of distance data for a given panorama image. Thus, it can be a consideration to only render the points that were actually captured by laser rays originating from or near the center of the panorama image. However, this leads to a relatively sparse rendering. To solve this limitation, surface elements (polygons of specific geometries) can be created by exploiting the scan pattern of the scanning system 302.

Continuing with FIG. 3, the abbreviated scan pattern 300 shows four laser rays (304, 306, 308, and 310) in time, as generated by the scan head(s) of the scanning system 302. In one specific scanning head implementation, generally, laser rays (304, 306, 308, and 310) are four different lasers on a single plane that generate corresponding points on radii labeled as L1-L4. At any point in time, the four lasers are pointing in generally the same heading (e.g., Northeast), but at different pitch angles (e.g., sky, street, etc.). A moment later, the heading changes to West, etc., moving in a clockwise rotation at any time t. Thus, the distance point measurements are obtained from the different lasers.

The surface elements derived from the scan pattern of the scanning system can be exploited to fill the coverage gap in consecutive images of the panorama camera system using local surface geometry for projection of the imagery into different viewpoints. In other words, a scan data point, since it has no color, is projected back to a panorama image (e.g. closest) by inferring an approximate geometric surface element, and then use the GPU (graphical processing unit) and/or standard graphics techniques to render a texture onto that polygonal patch. This not only solves problems with occlusions, but also removes noise. Millions of points are created from the four corners of the polygon actually measured. (It is assumed the polygon is a flat surface between the points in order to perform linear interpolation.)

More specifically, for example, by joining points L1 and L2 of the laser rays (304 and 306) at consecutive times (e.g., t and t+1) as the scanning head revolves, a polygon such as a quadrilateral surface element 312 can be defined using two triangular surface elements: a first triangular surface element TS1 and a second triangular surface element TS2. The triangular surface element TS1 can be created using three points L1(t), L2(t), L2(t+1), that cover the upper left portion of the quadrilateral surface element 312, and the second triangular surface element TS2 can be created using the three points L1(t), L1(t+1) and L2(t+1) that cover the lower right portion of the quadrilateral surface element 312.

Given at least three scan data points, for example, L1(t), L2(t), L2(t+1), the surface element TS1 can be aligned (registered) to a panorama image or a part thereof, thereby enabling color assignments for the scan data points, and thus, colored data points for the missed panorama pixel data. These triangular surface elements (TS1 and TS2) can be rasterized to create map pixels and to interpolate the depth on this area defined by the quadrilateral surface element 312. This approach not only provides an improvement when dealing with occlusions, but also avoids some problems with noise in the laser depth measurements. Data from the panorama images are rendered into the map projection (no image data is being discarded). No data is altered in the panorama images-only the map tiles being created.

Figure 4:
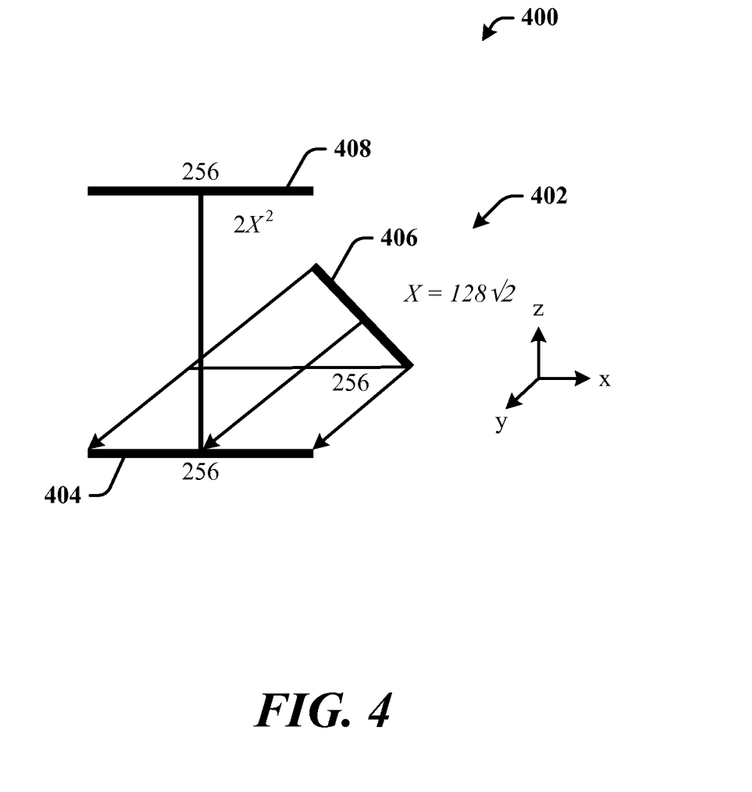
FIG. 4 illustrates a diagram of an oblique projection and flattening of an underlying map tile in accordance with the disclosed architecture.

FIG. 4 illustrates a diagram 400 of an oblique projection and flattening of an underlying map tile in accordance with the disclosed architecture. The approach to rendering such a map takes each distance point (e.g., defined by latitude ("lat"), longitude ("long"), altitude ("alt")) sensed by the scanning system 302 and projects the point to the desired map coordinate system. A map projection such as this "flattens out" the surface of the earth onto a rectangular 2D (two-dimensional) surface. Altitude (or elevation) can be re-introduced as the third coordinate.

Consider the map as a sheet of paper in the x-y plane. The elevation now becomes the z-coordinate on the z axis, and any orthographic projection of this cuboid can be rendered. Orthographic views do not have real perspective, so parallel lines remain parallel. Therefore, the orthographic view along any compass direction produces a rectangular grid that can be keyed with a quad key mechanism used by a map coordinate system.

The diagram 400 depicts the generation of a forty-five degree oblique view 402 of a base map tile 404, the base map tile 404 viewed as the oblique result 406. If this was a building, the purely top-down view will only show the tile 408. However, the oblique view 402 enables the user to view the façade of the building. In one implementation, at least five views can be rendered: top-down, and four oblique views from the North, South, East, and West. The base map tile 404 (e.g., a 256×256 pixel square) appears flattened (from the oblique view 402) to approximately 181 pixels (128 √2) square. It can be convenient to stretch the oblique result 406 back to the 256-pixel square, so that the map tile system can be used and the pixel with 0-elevation for a given (lat, long) coordinate is found exactly in the same pixel of the same map tile.

In oblique views along the compass directions, elevation maps to an offset along the positive or negative x-y axis of the map. For the final rendering to appear correct, pixels closer to the virtual camera (where "closer" is intended to mean higher in altitude and thus closer to the aerial view camera) occlude pixels further away (lower in altitude, so farther from the aerial view camera location). This same rule applies to the oblique views as well, of the points that project to map-pixel coordinates (x,y); the point closest to the camera is the point that has the highest elevation.

To recover the highest point, every point is rendered and the elevation of the source point (currently being rendered) is tracked for each map pixel. In other words, both a color image as well as a depth map are maintained for every map pixel (x,y). If a given map pixel has already been rendered, the depth map elevation of the already-rendered point is compared to the source elevation of the source point currently being rendered. If the new point has a higher elevation, both the elevation and the color are updated with the new value of the new point. This rule produces image tiles similar to aerial views. In another rule, the pixel with the lowest elevation is retrained. Alternative rules can be created to produce "slice views" (e.g., keep the color closest to specified elevation of interest), which can reveal the "middle layer" for structures that have more than two levels.

Figure 5:
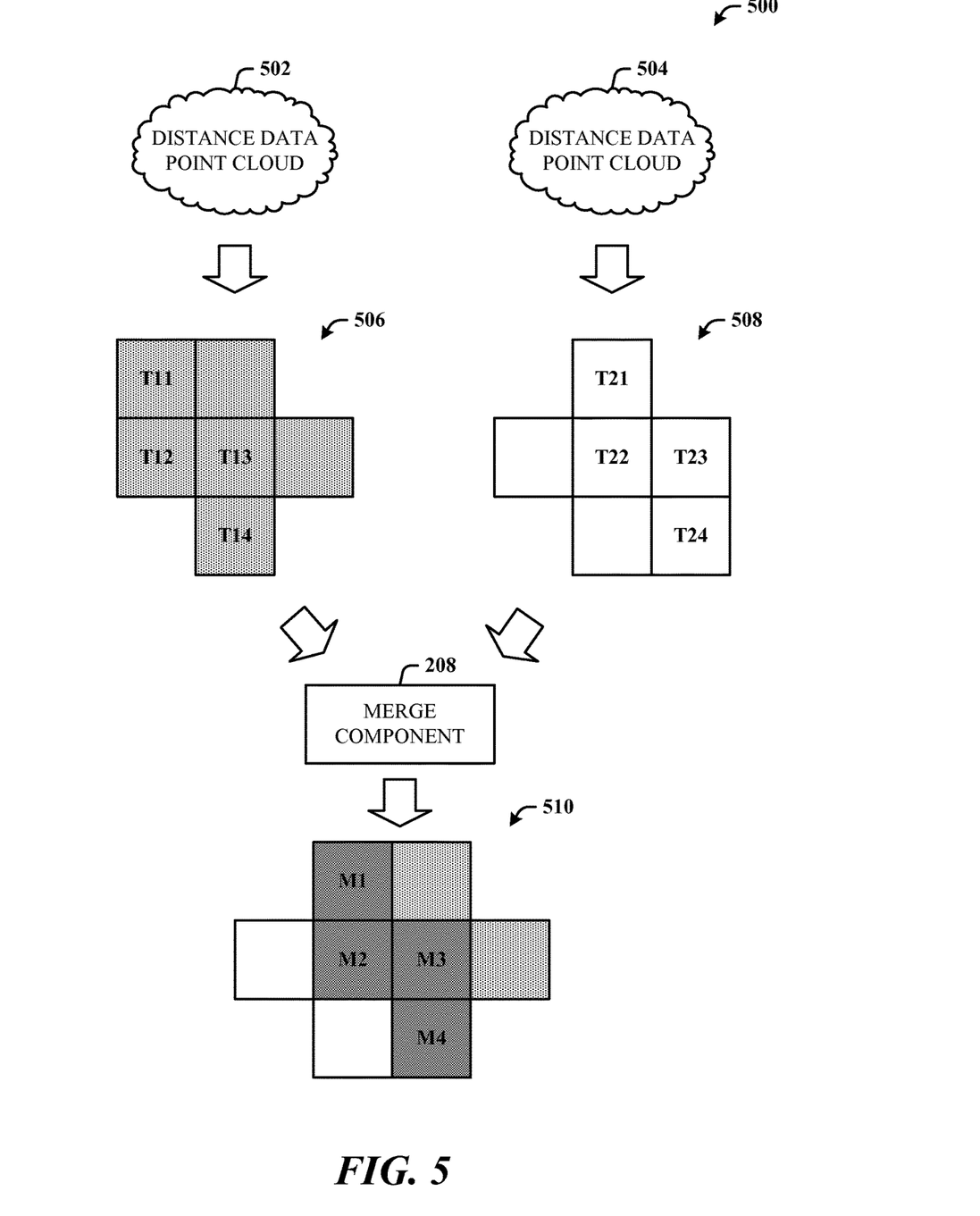
FIG. 5 illustrates a distributed and parallel rendering process of distance data and panorama images in accordance with the disclosed architecture.

FIG. 5 illustrates a distributed and parallel rendering process 500 of distance data and panorama images in accordance with the disclosed architecture. Similar to the panorama processing described above, the same map tile(s) can be rendered independently from separate scanning system scans, potentially covering different parts of the map tile. Multiple partial renderings are then merged into a single (partial) rendering by combining the color and height raster by retaining (e.g., always) the pixel (and height) in each of the source tiles that has the highest value in the height map. This process can be repeated recursively (e.g., in a map-reduce-like framework that processes and generates large amounts of data with a distributed algorithm for cluster parallel processing).

Here, two nodes (of the processing nodes 112) of different sets of distance data points (point clouds) are shown: a first node 502 (e.g., Node N1 of FIG. 1) and a second node 504 (e.g., Node N9 of FIG. 1). The scan points of the first node 502 can be used to render a first set 506 of six tiles, and the scan points of the second node 504 can be used to render a second set 508 of six tiles.

To produce different levels of detail (aerial views), four map tiles can be recursively combined into a new tile that is scaled back to a predetermined resolution (e.g., a 256×256-pixel square). The merge component 208 then merges the first set 506 of tiles and the second set 508 of tiles into the merged set 510 of tiles. The tiles to be merged, because of duplicative coverage of the same area, are designated T11, T12, T13, and T14 of the first set 506, and tiles T21, T22, T23, and T24 of the second set 508. The merger of tiles T11 and T21 is represented by merged tile M1, the merger of tiles T12 and T22 is represented by merged tile M2, and so on, and collectively depicted as in the merged set 510 as M1, M2, M3, and M4.

For continuous scanning systems that do not record color, to assign a color to a scanned point, the point is projected back to one of the panorama images that captured the scene. However, panorama images are not captured for every point in the scene. Rather, a panorama image may be captured at predetermined distances (e.g., approximately every four meters). Since every detail of the scene geometry is not recovered by the panorama images, it can be difficult to determine which, if any, of the panorama images has the correct color for a given point.

Figure 6:
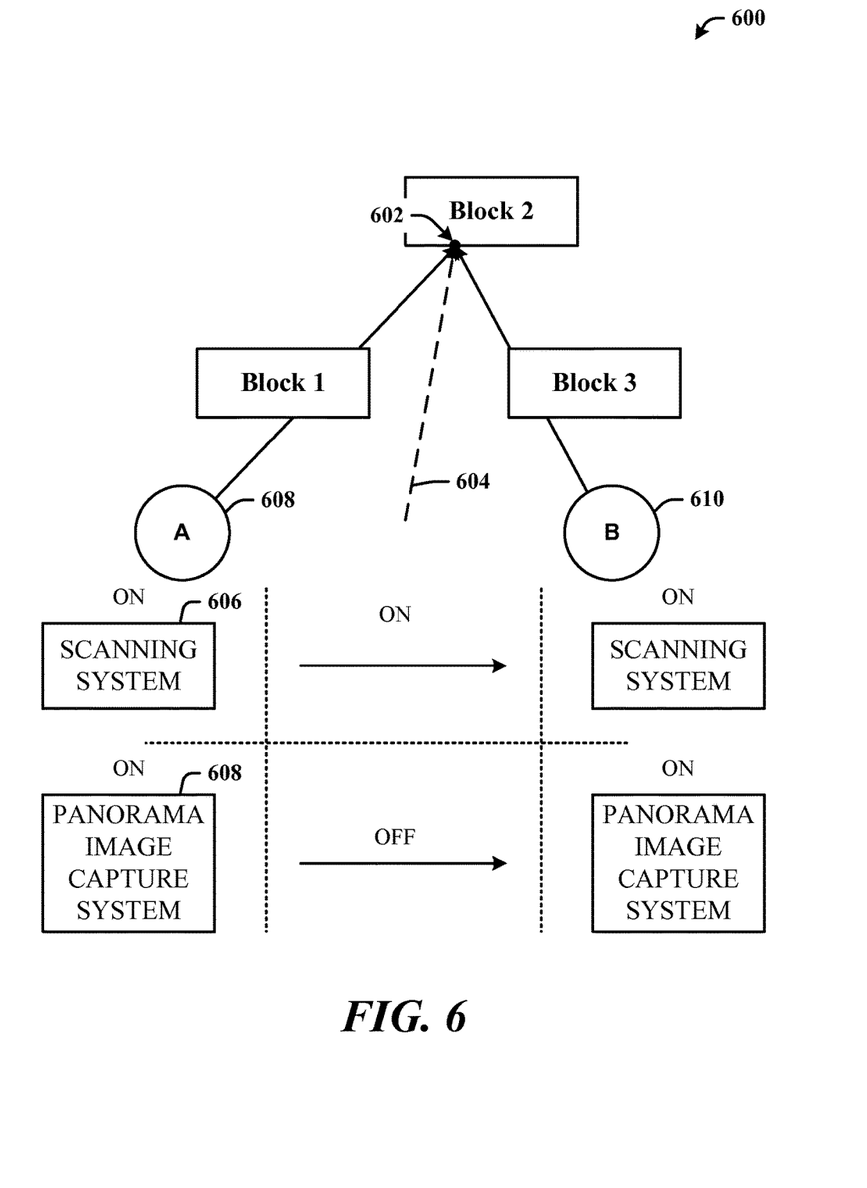
FIG. 6 illustrates a system that captures points that are not colored.

For example, FIG. 6 illustrates a system 600 that captures points that are not colored. Consider the point 602 recorded by the laser ray 604 (dashed line) using a scanning system 606. When continuously scanning three objects (e.g., Block 1, Block 2, and Block 3), the scanning system 606 can recover the surface point 602 on Block 2 (the object behind two closer blocks (Block 1 and Block 3)), but a panorama image capture system 608, when at location A, is blocked by the object Block 1 from capturing the point 602, and when at location B, the panorama image capture system capture system 608 is again blocked from capturing the point 602, this time by the object Block 3. Additionally, if the capture on/off distance of the panorama image capture system 608 is such that while moving left to right the camera of the capture system 608 captures at location A, followed by location B, but does not capture data when traveling between the locations A and B, then point 602 is not captured by the panorama image capture system 608.

Hence, the scanning system 606 facilitates the rendering of the missing pixels in the gap (between location A and Location B) of the panorama image capture system 608 using scan distance data, by rendering scanned data points (e.g., LIDAR) and assigning color based on the closest panorama image to the laser ray origin. Another technique can be to interpolate the missing pixels using points on consecutive panorama images from location A to location B to arrive at the colors of the points in the coverage gap. Yet another technique can be to combine multiple viewpoints from the panoramic imagery to create a less fractured representation of the distance data and map layers.

The above processes enable the concurrent processing of large amounts of scan data. The input scan data is split (parsed) into arbitrary segments of scans and rendered independently into map tiles. The map tiles with the same quad key are then reduced to a single map tile using the above merge process.

An additional problem can be introduced by moving objects in the scene. In this context, most moving objects are cars, which are known to be on the street. Since the general configuration of a vehicle is known, it can further be deduced as to where to expect the road surface to be near the vehicle. It can therefore be inferred if a certain triangle (scanning system polygon) near the vehicle represents a road surface, based on the normal (line perpendicular to a face or side of the triangle) and height (relative to car) of the triangle. If the normal faces the same as the vehicle "up" vector, and the elevation matches the bottom of the wheels, it can be inferred that the triangle represents the road surface. Thus, such triangle data can be allowed to overwrite pixel data, even if the triangle data is not the highest elevation data. This enables the removal of some moving vehicles from the street, if the street is seen in at least one panorama image.

The use of LIDAR enables access to street surface information that is often occluded by trees or other overpassing roads in normal aerial views. Such occlusion occur mostly under bridges, multi-layered highways, tunnels, or narrow streets or avenues with dense coverage of tall trees. Three dimensional (3D) LIDAR points are exploited to create map tiles at lower elevations to visualize the hidden roads. In most cases, overpassing roads form at most two elevation layers in the physcial world. In one implementaiton, generating two layers of map tiles at different elevations can be deemed sufficient for hidden road navigation. The top layer of map tiles is formed by taking the pixels at their highest elevation as described herein for the nadir or oblique views. The bottom layer, on the other hand, is formed by taking the pixels at the lowest elevation. In this way, the top layer (the lowest level of detail, yet sufficient to enable the user to understand the general location being viewed from altitude) includes all street information from the top-down view, and the bottom layer (the highest level of detail, sufficient to enable the user to view the scene in the greatest detail) contains street surface that exists under overpassing objects.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
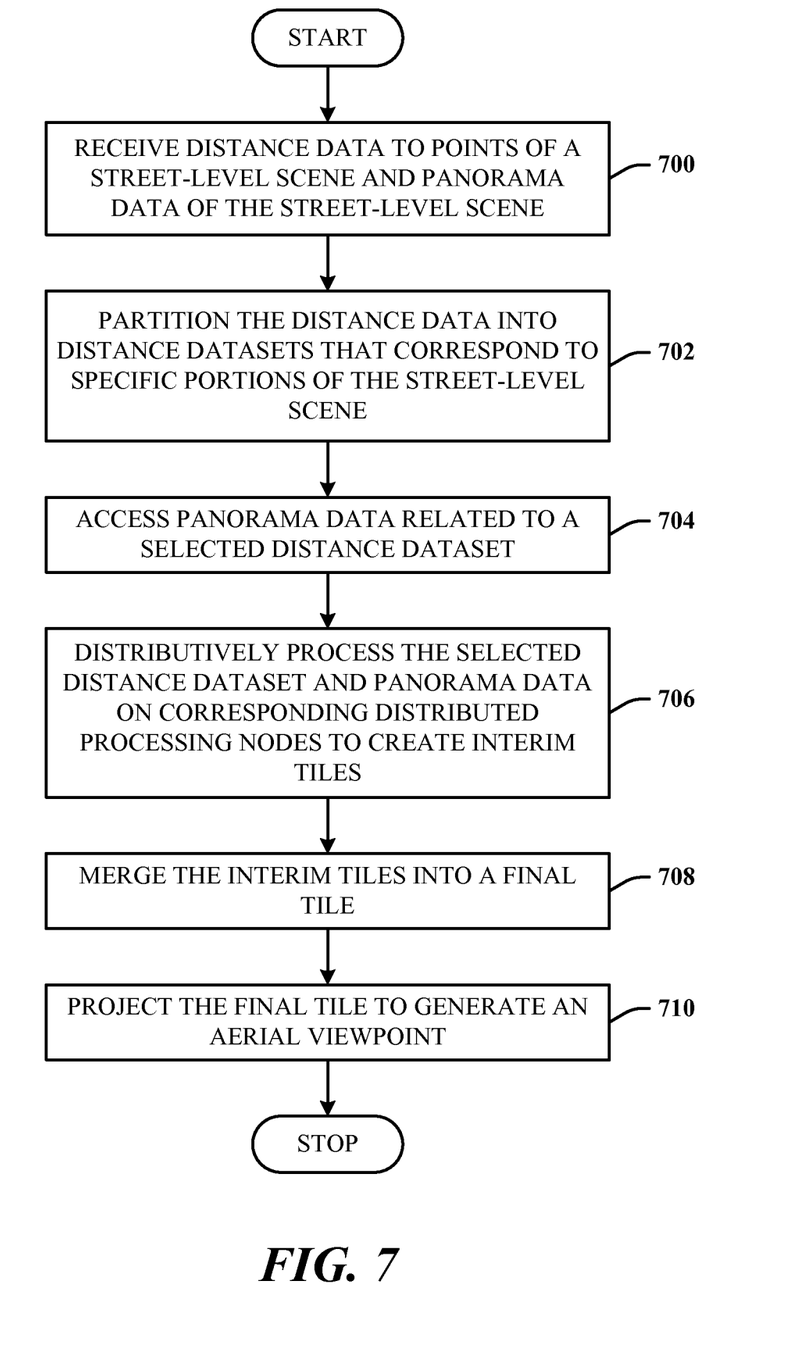
FIG. 7 illustrates a method in accordance with the disclosed architecture.

FIG. 7 illustrates a method in accordance with the disclosed architecture. At 700, distance data to points of a street-level scene are received and panorama data of the street-level scene is received. At 702, the distance data is partitioned into distance datasets that correspond to specific portions of the street-level scene. At 704, panorama data related to a selected distance dataset is accessed. At 706, the selected distance dataset and panorama data are distributively processed on corresponding distributed processing nodes to create interim tiles. At 708, the interim tiles are merged into a final tile. At 710, the final tile is projected to generate an aerial viewpoint.

The method can further comprise adjusting the aerial viewpoint using various levels of view adjustment (e.g., zoom in or out, rotation about the scene, etc.). The method can further comprise receiving the distance data from a multi-head distance acquisition scanning system. The method can further comprise generating polygons based on a scan pattern of the scanning system, the polygons having a specific geometry, and projecting imagery onto the geometry.

The method can further comprise choosing a closer point that is closer to the scanning system when compared to a prior farther point that is farther from the scanning system. The method can further comprise processing arbitrary subsets of the distance data independently into tiles of color and depth and merging multiple renderings of the same tile using depth maps. The method can further comprise providing visualization of multiple elevation layers of road maps to enable navigation of roads visually hidden by overpassing roads.

Figure 8:
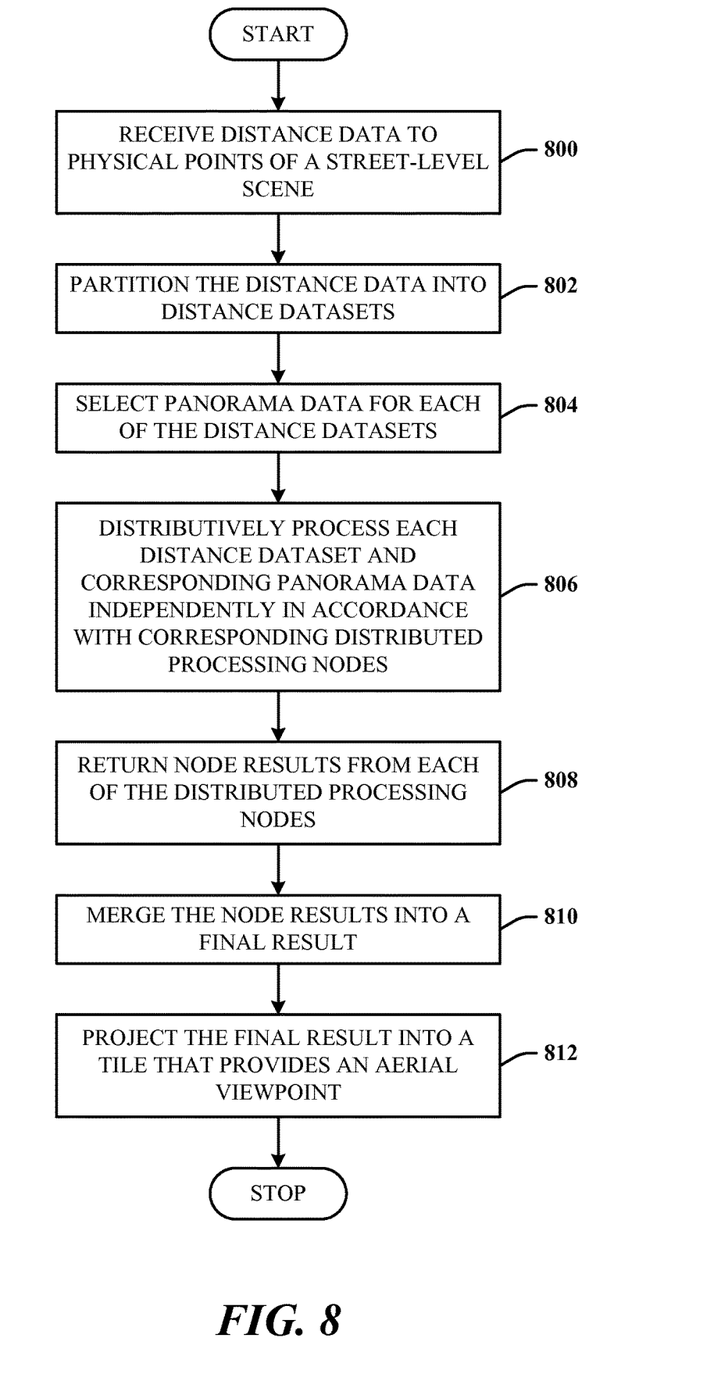
FIG. 8 illustrates an alternative method in accordance with the disclosed architecture.

FIG. 8 illustrates an alternative method in accordance with the disclosed architecture. At 800, distance data to physical points of a street-level scene is received. At 802, the distance data is partitioned into distance datasets. At 804, panorama data is selected for each of the distance datasets. At 806, each distance dataset and corresponding panorama data are distributively processed independently in accordance with corresponding distributed processing nodes. At 808, node results are returned from each of the distributed processing nodes. At 810, the node results are merged into a final result. At 812, the final result is projected into a tile that provides an aerial viewpoint.

The method can further comprise rendering pixel data missed in the panorama data by using the distance data. The method can further comprise removing visual clutter from a route using road surface estimation. The method can further comprise generating polygons based on a LIDAR scan pattern.

The method can further comprise visualizing multiple elevations of layers of map features. The method can further comprise representing tiles as an orthographic map projection that enables aerial viewing at various levels of detail and from multiple points of view and elevations.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
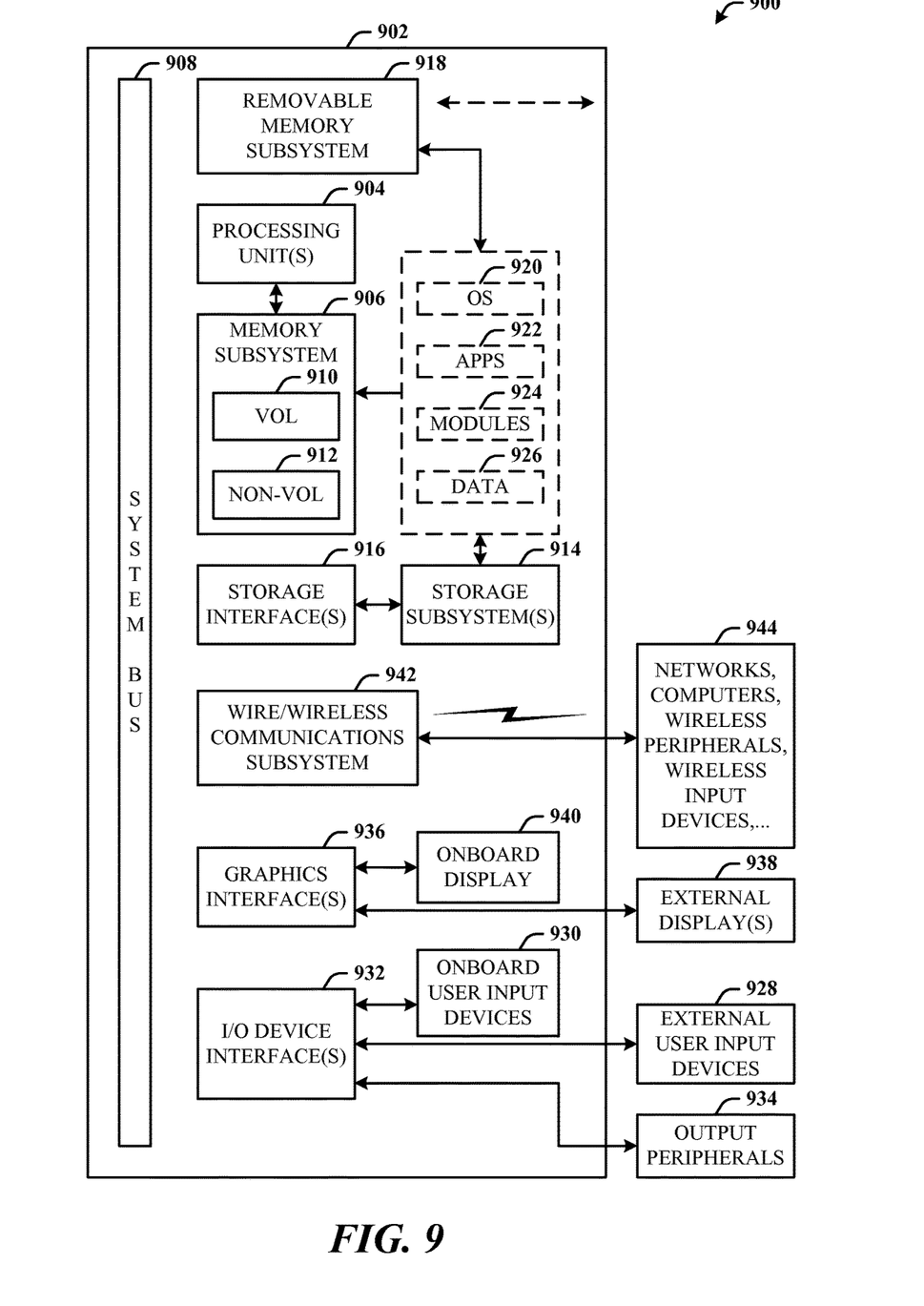
FIG. 9 illustrates a block diagram of a computing system that executes map-like visualization of street-level distance data and panorama data in accordance with the disclosed architecture.

Referring now to FIG. 9, there is illustrated a block diagram of a computing system 900 that executes map-like visualization of street-level distance data and panorama data in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 900 for implementing various aspects includes the computer 902 having microprocessing unit(s) 904 (also referred to as microprocessor(s) and processor(s)), a computer-readable storage medium (where the medium is any physical device or material on which data can be electronically and/or optically stored and retrieved) such as a system memory 906 (computer readable storage medium/media also include magnetic disks, optical disks, solid state drives, external memory systems, and flash memory drives), and a system bus 908. The microprocessing unit(s) 904 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 902 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 906 can include computer-readable storage (physical storage) medium such as a volatile (VOL) memory 910 (e.g., random access memory (RAM)) and a non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the microprocessing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components and circuits. The storage subsystem(s) 914 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The operating system 920, one or more application programs 922, other program modules 924, and/or program data 926 can include items and components of the system 100 of FIG. 1, items and components of the system 200 of FIG. 2, items and component in the pattern 300 of FIG. 3, the diagram 400 of FIG. 4, items and components of the process 500 of FIG. 5, items and components of the system 600 of FIG. 6, and the methods represented by the flowcharts of FIGS. 7 and 8, for example.

Generally, programs include routines, methods, data structures, other software components, etc., that perform particular tasks, functions, or implement particular abstract data types. All or portions of the operating system 920, applications 922, modules 924, and/or data 926 can also be cached in memory such as the volatile memory 910 and/or non-volatile memory, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 902, and include volatile and non-volatile internal and/or external media that is removable and/or non-removable. For the computer 902, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 902, programs, and data using external user input devices 928 such as a keyboard and a mouse, as well as by voice commands facilitated by speech recognition. Other external user input devices 928 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 902, programs, and data using onboard user input devices 930 such a touchpad, microphone, keyboard, etc., where the computer 902 is a portable computer, for example.

These and other input devices are connected to the microprocessing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as a system, comprising: means for receiving distance data to points of a street-level scene and panorama data of the street-level scene; means for partitioning the distance data into distance datasets that correspond to specific portions of the street-level scene; means for accessing panorama data related to a selected distance dataset; means for distributively processing the selected distance dataset and panorama data on corresponding distributed processing nodes to create interim tiles; means for merging the interim tiles from each of the distributed processing nodes into a final tile; and means for projecting the final tile to generate an aerial viewpoint.

The disclosed architecture can be implemented alternatively as a system, comprising: means for receiving distance data to physical points of a street-level scene; means for partitioning the distance data into distance datasets; means for selecting panorama data for each of the distance datasets; means for distributively processing each distance dataset and corresponding panorama data independently in accordance with corresponding distributed processing nodes; means for receiving node results from each of the distributed processing nodes; means for merging the node results into a final result; and means for projecting the final result into a tile that provides an aerial viewpoint.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system to generate a three-dimensional oblique aerial map view, comprising:
   one or more processors;
   a non-transitory computer readable storage medium comprising instructions, that when executed by the one or more processors, cause the one or more processors to:
      receive distance data to points in a street-level scene and panorama images that include the street-level scene, the distance data sensed using a LIDAR scanning system and the panorama images captured using an image-capture system;
      responsive to a determination that a first scan data point in the distance data has a missing pixel value in the panorama images:
         interpolate a pixel value for the missing pixel value based at least on pixel data of the panorama images that correspond to scan data points adjacent in location to the first scan data point;
      substitute the interpolated pixel value for the missing pixel value;
      distributively process the distance data and the panorama images using distributed computing nodes, each computing node configured to process an arbitrary set of the panorama images into image tiles and the distance data into associated depth maps of specified orthographic projections;
      merge two or more partial renderings of an image tile of a same area into a single rendering of the image tile using z-buffer values of associated depth maps by retaining pixel values in the two or more partial renderings that have a highest z-buffer value of the associated depth maps, each of the two or more partial renderings of the image tiles rendered independently from different panorama images; and
      generate a three-dimensional oblique aerial viewpoint based on the image tiles.

2. The system of claim 1, the non-transitory computer readable storage medium comprising further instructions, that when executed by the processor, cause the processor to:
   generate polygons of a specific geometry based on a scan pattern of the scanning system.

3. The system of claim 2, the non-transitory computer readable storage medium comprising further instructions, that when executed by the processor, cause the processor to:
   project the panorama images onto the polygons to create projected images as the specified orthographic projections.

4. The system of claim 2, the non-transitory computer readable storage medium comprising further instructions, that when executed by the processor, cause the processor to:
   generate depth maps of the polygons onto a z-buffer as the depth maps of the specified orthographic projections.

5. The system of claim 1, wherein the distributed computing nodes each processes a specific arbitrary set of the distance data, and one or more of the panorama images associated only with the specific arbitrary set.

6. A method, comprising:
- receiving distance data to points of a street-level scene and panorama data of the street-level scene, the distance data sensed using a LIDAR scanning system and the panorama data captured using an image-capture system;
- partitioning the distance data into distance datasets that correspond to specific portions of the street-level scene;
- accessing panorama data related to a selected distance dataset;
- responsive to determining that a first scan data point in the selected distance dataset has a missing pixel value in the panorama data:
  - interpolating a pixel value for the missing pixel value based at least on pixel data of the panorama data that correspond to scan data points adjacent in location to the first scan data point; and
  - substituting the interpolated pixel value for the missing pixel value;
- distributively processing the selected distance dataset and panorama data on corresponding distributed processing nodes to create interim tiles, each computing node configured to process an arbitrary set of the panorama data into interim tiles and the distance dataset into associated depth maps;
- merging two or more partial renderings of an interim tile of a same area into a single rendering of the interim tile using z-buffer values of associated depth maps by retaining pixel values in the two or more partial renderings that have a highest z-buffer value of the associated depth maps, each of the two or more partial renderings of the interim tiles rendered independently from different panorama data;
- merging the interim tiles from each of the distributed processing nodes into a final tile; and
- projecting the final tile to generate an aerial viewpoint.

7. The method of claim 6, further comprising adjusting the aerial viewpoint using various levels of view adjustment.

8. The method of claim 6, further comprising receiving the distance data from a multi-head distance acquisition scanning system.

9. The method of claim 8, further comprising generating polygons based on a scan pattern of the scanning system, the polygons having a specific geometry, and projecting imagery onto the geometry.

10. The method of claim 8, further comprising choosing a closer point that is closer to the scanning system when compared to a prior farther point that is farther from the scanning system.

11. The method of claim 6, further comprising providing visualization of multiple elevation layers of road maps to enable navigation of roads visually hidden by overpassing roads.

12. A method, comprising acts of:
- receiving distance data to physical points of a street-level scene, the distance data sensed using a LIDAR scanning system;
- partitioning the distance data into distance datasets;
- selecting panorama data for each of the distance datasets, the panorama data captured using an image-capture system;
- responsive to determining that a first scan data point in one of the distance dataset has a missing pixel value in the corresponding panorama data:
  - interpolating a pixel value for the missing pixel value based at least on pixel data in the panorama data that correspond to scan data points adjacent in location to the first scan data point; and
  - substituting the interpolated pixel value for the missing pixel value;
- distributively processing each distance dataset and corresponding panorama data independently in accordance with corresponding distributed processing nodes, wherein two or more renderings of each portion of panorama data of a same area are merged using the z-buffer values of corresponding distance dataset by retaining pixel values in the two or more renderings that have the highest z-buffer value of the corresponding distance dataset, each of the two or more renderings rendered independently from different panorama data;
- receiving node results from each of the distributed processing nodes;
- merging the node results into a final result; and
- projecting the final result into a tile that provides an aerial viewpoint.

13. The method of claim 12, further comprising removing visual clutter from a route using road surface estimation.

14. The method of claim 12, further comprising generating polygons based on a LIDAR scan pattern.

15. The method of claim 12, further comprising visualizing multiple elevations of layers of map features.

16. The method of claim 12, further comprising representing tiles as an orthographic map projection that enables aerial viewing at various levels of detail and from multiple points of view and elevations.

* * * * *

UNITED STATES PATENT AND TRADEMARK OFFICE
CERTIFICATE OF CORRECTION

PATENT NO. : 9,984,494 B2  
APPLICATION NO. : 14/605912  
DATED : May 29, 2018  
INVENTOR(S) : Timo Pylvaenaeinen et al.

Page 1 of 1

It is certified that error appears in the above-identified patent and that said Letters Patent is hereby corrected as shown below:

In the Claims

Column 18, Claim 14, Line(s) 41: "based on a LID AR scan" to read as -- based on a LIDAR scan --

Signed and Sealed this
Thirtieth Day of October, 2018

Andrei Iancu
*Director of the United States Patent and Trademark Office*